US007716827B2

(12) United States Patent
Eriksson

(10) Patent No.: US 7,716,827 B2
(45) Date of Patent: May 18, 2010

(54) RELUCTOR RING INSTALLATION TOOL

(75) Inventor: Lars Eriksson, Sanford, FL (US)

(73) Assignee: Goodson Mfg., Winona, MN (US)

( * ) Notice: Subject to any disclaimer, the term of this patent is extended or adjusted under 35 U.S.C. 154(b) by 671 days.

(21) Appl. No.: 10/974,779

(22) Filed: Oct. 28, 2004

(65) Prior Publication Data

US 2006/0096090 A1 May 11, 2006

(51) Int. Cl.
*B23P 17/00* (2006.01)

(52) U.S. Cl. .................................... 29/888.08; 29/6.01

(58) Field of Classification Search ............. 29/888.08, 29/6.01, 281.5, 281.6; 81/47, 48.1–48.2; 362/269, 287, 427, 431
See application file for complete search history.

(56) References Cited

U.S. PATENT DOCUMENTS 3,686,739 A 8/1972 Manero
4,161,068 A * 7/1979 McMaster .................... 33/412
4,381,538 A * 4/1983 Warshawsky ............... 362/269
4,535,979 A 8/1985 Paarmann
4,748,739 A 6/1988 Muradliyan
4,910,856 A 3/1990 Watanabe
5,104,162 A 4/1992 Watanabe
5,199,182 A 4/1993 Fowler
5,983,477 A 11/1999 Jacks et al.
6,553,643 B2 4/2003 Relan et al.

OTHER PUBLICATIONS

Marked-up 4,161,068.*

* cited by examiner

*Primary Examiner*—Rick K Chang
(74) *Attorney, Agent, or Firm*—Matthew A. Pequignot; Pequignot + Myers LLC

(57) ABSTRACT

The present invention concerns an apparatus for aligning and/or installing reluctor rings on crankshafts. The apparatus include a tool body having first and second alignment mechanisms which register with crankshaft and reluctor ring apertures for aligning the reluctor rings on the crankshafts in a correct phase orientation for proper ignition timing.

11 Claims, 4 Drawing Sheets

RELUCTOR RING INSTALLATION TOOL

FIELD OF THE INVENTION

This invention relates to tools for aligning and/or installing reluctor rings on a crank shaft. In at least one preferred embodiment, this invention relates to a tool having at least first and second alignment mechanisms for aligning a reluctor ring in a correct phased position on a crankshaft.

BACKGROUND OF THE INVENTION

In the field of automotive repair there is an occasional need for the removal and reinstallation of a reluctor ring. The reluctor ring is typically attached to the crankshaft for the purpose of controlling cylinder timing. In a conventional automotive engine, the reluctor ring provides information about the rotational position and speed of the crankshaft in order to signal the need and/or timing of a spark in appropriate cylinders (i.e. to trigger ignition thereof). In such electronic ignition systems the current of a sensor circuit, in conjunction with the reluctor ring, is intermittently broken by the teeth rotating on the crankshaft mounted reluctor ring. This, in turn, provides the necessary information for correctly timed cylinder ignition.

Replacement of the reluctor ring may be necessitated, or at least recommended, in various circumstances. For example, when repairing or reconditioning a crankshaft, the reluctor ring is often damaged upon its removal. Damage to a reluctor ring can occur in other circumstances as well and/or it may become necessary to periodically clean debris from between the reluctor ring and crankshaft. Circumstances in which reluctor rings are damaged are not uncommon since the reluctor ring is traditionally a relatively weak structure that is highly susceptible to warping or breakage e.g. such as during removal.

A difficulty encountered in the reassembly of the crankshaft and reluctor ring is the alignment of the reluctor ring with respect to the crankshaft. In particular, the alignment of the ring is critical for the engine to start and ignite properly i.e. because the rotational position of the reluctor ring determines the timing of cylinder ignition, and, when improperly installed, the engine will not start. Since typical factory installed reluctor rings do not contain a notch or reference for indexing crank angle degrees, and because it is difficult to adjust the rotational orientation of a reluctor ring once installed (e.g. because they are typically press-fit or heat-fit onto a crankshaft) there exists a need for a reluctor ring alignment and installation tool which simplifies reluctor ring installation processes.

In view of the above drawbacks in the prior art, there exists a need for apparatus and/or methods, or combination thereof, which overcome, or at least ameliorate, the above drawbacks. It is a purpose of this invention to fulfill these needs in the art, as well as other needs which will become apparent to the skilled artisan once given the above disclosure.

SUMMARY OF THE INVENTION

Generally speaking, this invention addresses the above drawbacks by providing:

a tool for installing a reluctor ring on a crankshaft comprising:

a tool body;

a first alignment mechanism;

a second alignment mechanism located spaced apart from the first alignment mechanism;

wherein the first and second alignment mechanisms are so located and spaced, one with respect to the other, such that when a preselected crankshaft reference aperture is aligned with the first alignment mechanism and a preselected reluctor ring reference aperture is aligned with the second alignment mechanism, the reluctor ring is in a substantially correct phase orientation for installation on the crankshaft.

In an alternative embodiment there is provided:

a method of installing a reluctor ring on a crankshaft in a correct phased orientation for calibrating ignition timing utilizing a reluctor ring installation tool comprising:

a tool body;

a first alignment mechanism;

a second alignment mechanism located spaced apart from the first alignment mechanism;

wherein the first and second alignment mechanisms are so located and spaced, one with respect to the other, such that when a preselected crankshaft reference aperture is aligned with the first alignment mechanism and a preselected reluctor ring reference aperture is aligned with the second alignment mechanism, the reluctor ring is in a substantially correct phase orientation for installation on the crankshaft; and wherein the method comprises:

placing a reluctor ring having a central aperture over a crankshaft end such that the crankshaft end resides within the central aperture;

placing the reluctor ring installation tool over the crankshaft end such that the reluctor ring is located substantially between a portion of the crankshaft and the tool, aligning the first alignment mechanism with a preselected crankshaft reference aperture;

aligning the second alignment mechanism with a preselected reluctor ring reference aperture;

wherein, when the first and second alignment mechanisms are aligned with the preselected crankshaft reference aperture and the preselected reluctor ring reference aperture, respectively, the reluctor ring is in a substantially correct phase orientation for engine ignition timing.

In at least one embodiment of the subject invention, it is an object to simplify and/or make more efficient the installation of a reluctor ring on a crankshaft. In another embodiment, it is an object of the invention to provide a device that simplifies the rotational alignment and installation of a reluctor ring on a crankshaft through the use of at least two alignment mechanisms (e.g. pins or dowels) in cooperation with a tool body.

In still further embodiments of the subject invention, it is an object to provide a reluctor ring installation tool in which at least one, or both, of the alignment mechanisms are configurable in a plurality of spatial orientations thereby to allow the installation tool to be used with a plurality of reluctor ring and/or crankshaft types. In a preferred embodiment, at least one of the alignment mechanisms is user locatable in at least two dimensions, but more preferably in at least three dimensions. In still further preferred embodiments, both alignment mechanisms are user adjustable at least axially, but more preferably at least axially and spatially one with respect to the other.

In still additional embodiments, it is an object to provide a method of installing a reluctor ring, employing an installation tool, which is more time efficient, accurate, and less prone to error.

DETAILED DESCRIPTION OF THE INVENTION

For a more complete understanding of the present invention and advantages thereof, reference is now made to the following description of various illustrative and non-limiting embodiments thereof, taken in conjunction with the accompanying drawings in which like reference numbers indicate like features.

Figure 1:
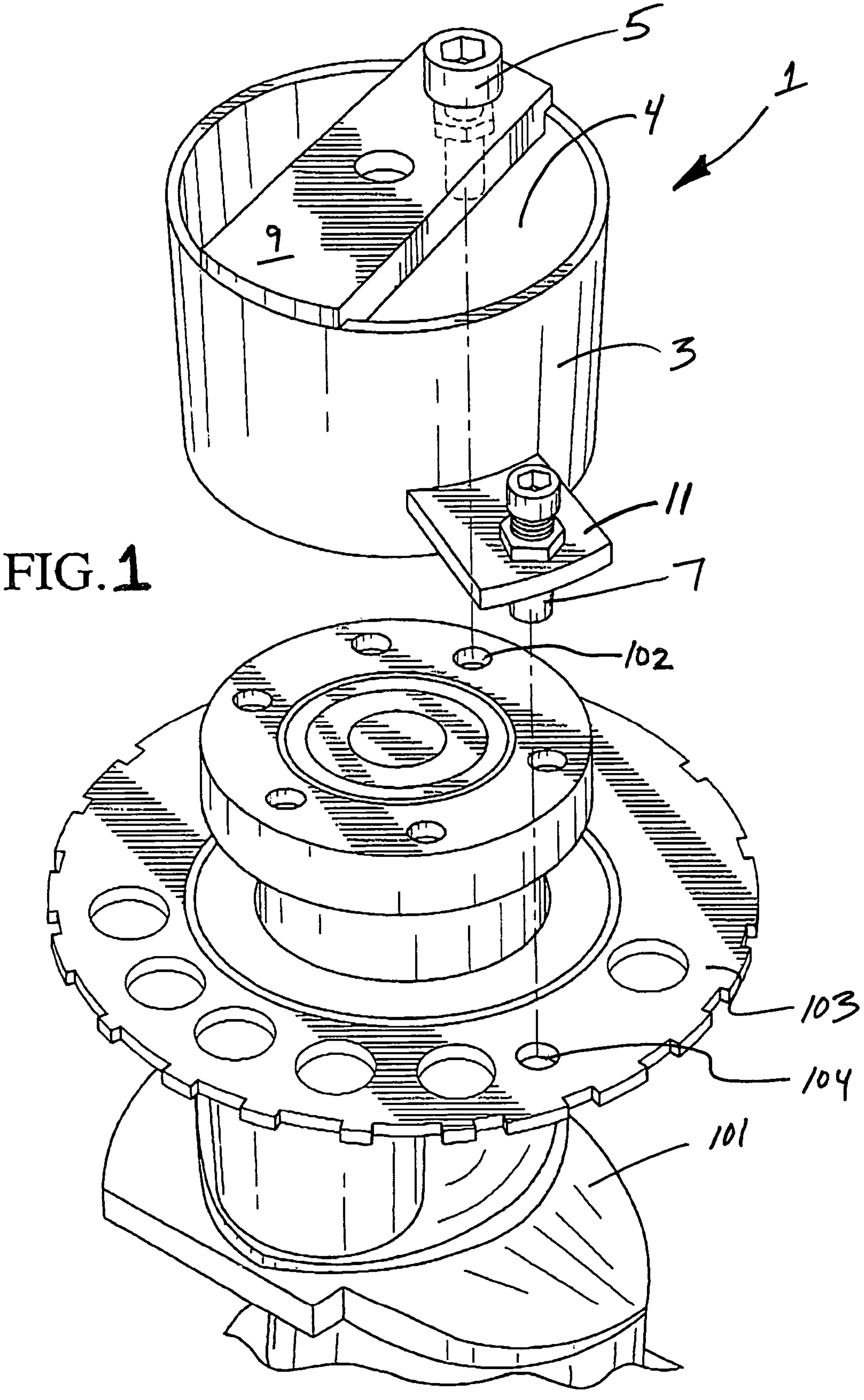
FIG. 1 is a three-dimensional perspective view of one embodiment of a reluctor ring installation tool according to the subject invention illustrated in the environment in which it finds utility in preparation for aligning a reluctor ring on a crankshaft.

With reference initially to FIG. 1, therein is illustrated an exemplar embodiment of a reluctor ring installation tool according to the subject invention. As illustrated, tool 1 generally comprises a tool body 3 in combination with a first alignment mechanism 5 and a second alignment mechanism 7, each provided for accomplishing or performing reluctor ring "phase" alignment (i.e. the angular alignment of the reluctor ring on a crankshaft) during reluctor ring installation on crankshaft 101 (as will be described in more detail below). In the embodiment as shown, tool body 3 is constructed from a cylindrical tube which, in preferred embodiments, is configured to have a cylindrical opening 4 via which the tool can be placed on the cylindrical end of a crankshaft. First alignment mechanism 5 is located, preferably at least partially, within, or in proximity to, cylindrical opening 4 (e.g. attached to tool body 3 via cross member 9), and second alignment mechanism 7 is, in the illustrated embodiment, located on an exterior surface of tool body 3 (e.g. attached thereto via flange 11).

In FIG. 1, tool 1 is illustrated oriented above crankshaft 101 and reluctor ring 103 for sake of clarity. Although shown as such, it is understood, for example, that during actual reluctor ring installation when utilizing tool 1, reluctor ring 103 is in cooperative communication with tool 1 with alignment mechanism 7 engaged thereto. Further details regarding reluctor ring installation in correct angular phase orientation will, of course, be provided in more detail below.

Figure 2:
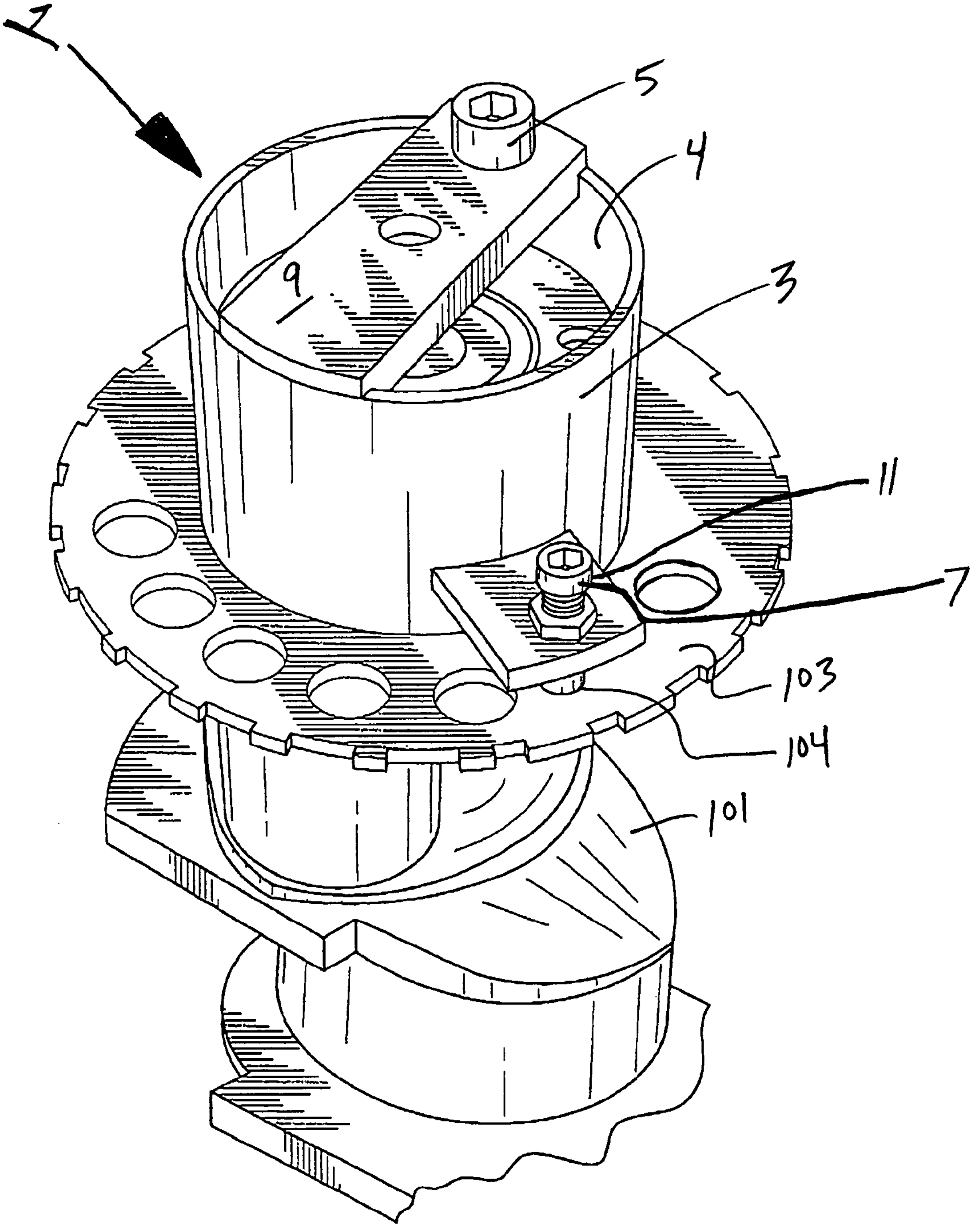
FIG. 2 is a three-dimensional perspective view of the embodiment of the invention illustrated in FIG. 1 shown, in use, aligning a reluctor ring on a crankshaft.

Referring now to FIG. 2, this figure illustrates a perspective view of a preferred embodiment of the disclosed invention when it is engaged to both crankshaft 101 and reluctor ring 103. Although not necessary, it may be seen, in this embodiment, that tool body 3 has an inner diameter just larger than the outer diameter of the crankshaft portion to which it is mounted so that it can engage crankshaft 101 in a preferably close fitting manner. In this regard, it is desirable to ensure that the tolerance of the "fit" relationship be reduced to a minimum, in this embodiment (if possible), thereby to improve the ability of the tool to be stable on the crankshaft end (e.g. so that alignment integrity is not compromised).

Alignment mechanisms 5 and 7, in preferred embodiments, are pins or dowel like rods which are specifically sized to fit in pre-selected, particularly dimensioned apertures located on crankshaft 101 and reluctor ring 103. In further preferred embodiments, the alignment mechanisms are adjustable axially within apertures 13 and 15 (see FIG. 3) in which they reside thereby to allow length tailorability of the alignment mechanisms. Such tailorability is useful, in some embodiments, by enabling the effective length of the alignment mechanisms (e.g. the length to which they extend downwardly) to be adjusted so that engagement with respective crankshaft alignment reference apertures (e.g. reference aperture 102) and reluctor ring alignment reference apertures (e.g. reference aperture 104) is possible to permit proper use of the tool. In this regard, alignment mechanisms 5 and 7 and apertures 13 and 15 are preferably threaded so that the length of the alignment mechanism can be adjusted by simply "threading" or "unthreading" the alignment mechanisms to whatever degree or length is desired. Alternative means for adjustability are, of course, contemplated.

Figure 3:
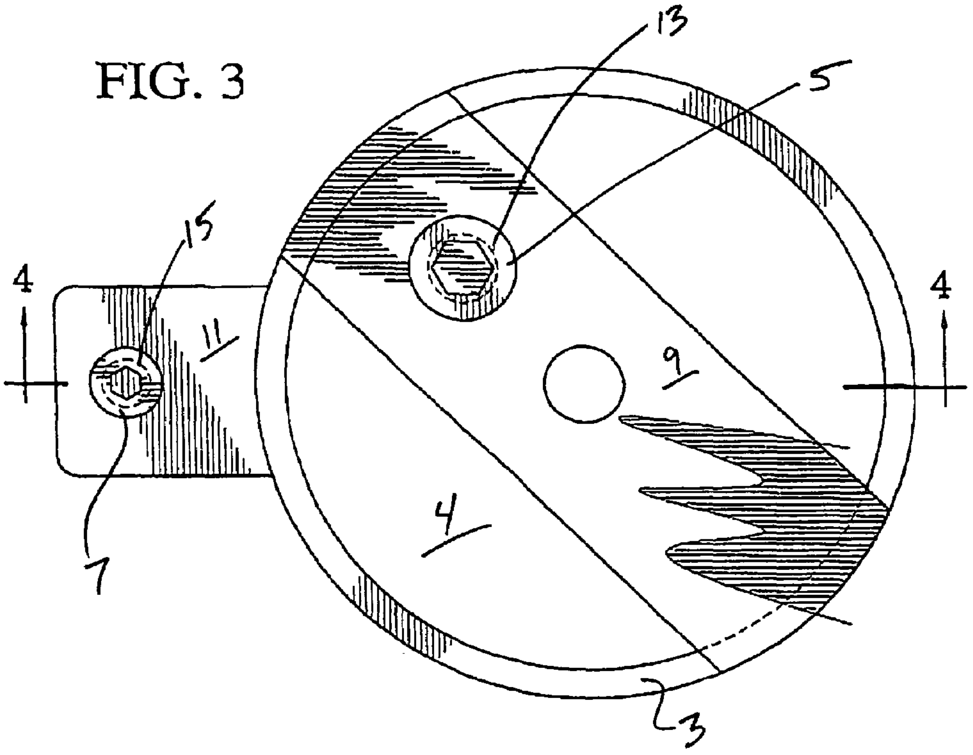
FIG. 3 is a top view of the embodiment of the reluctor ring installation tool illustrated in FIG. 1.
Figure 4:
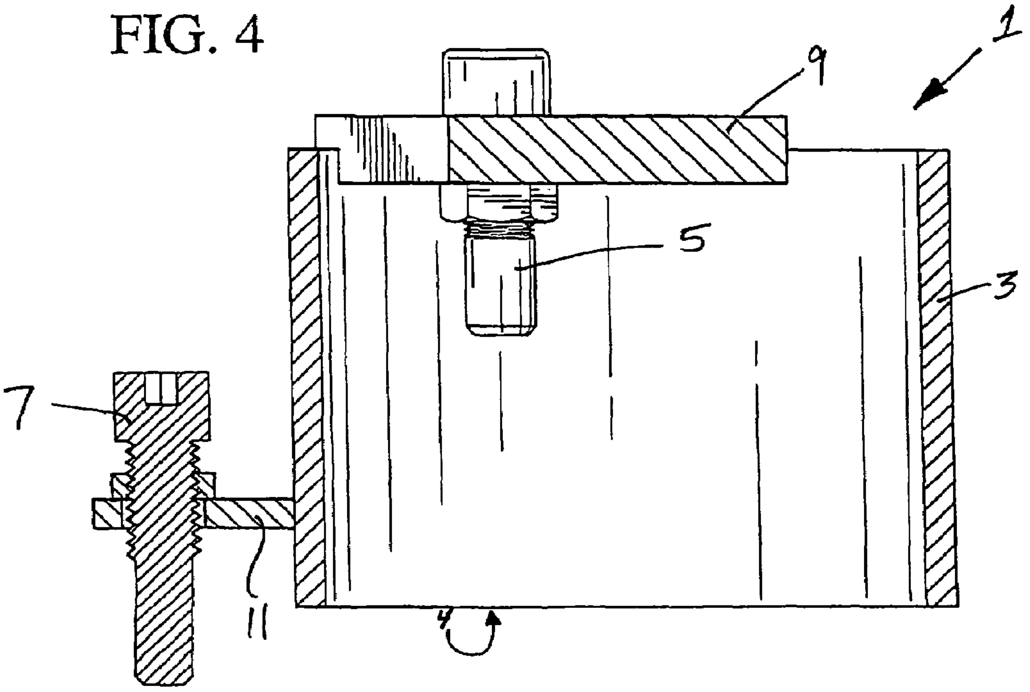
FIG. 4 is a profile view of the reluctor ring installation tool illustrated in FIG. 3 with certain parts shown in x-ray for clarity.

Turning now to FIGS. 3 and 4, therein is illustrated top and profile views of an embodiment of tool 1 with FIG. 3 best showing an example relative radial positioning of each alignment mechanism. Furthermore, the means by which alignment mechanisms 5 and 7 are connected to tool body 3 are illustrated in x-ray detail in these figures (e.g. via cross bar 9 and flange 11, respectively, such parts being positionally adjustable in some embodiments, as discussed below).

Figure 5:
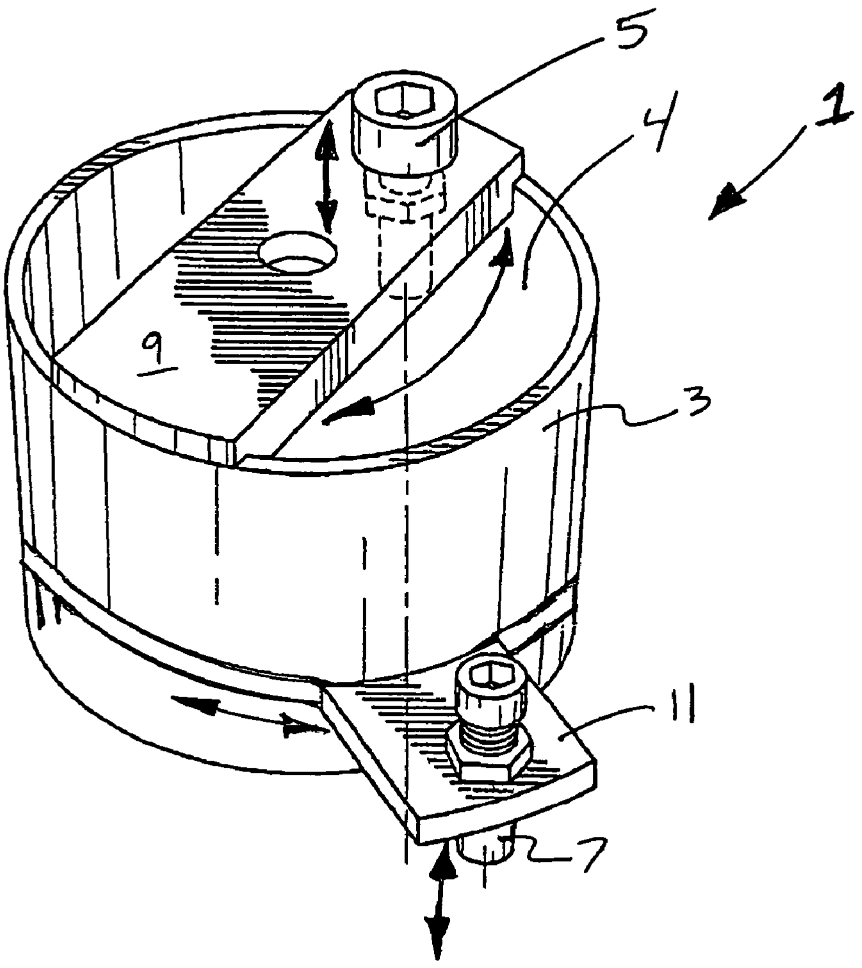
FIG. 5 is a three-dimensional perspective view of a reluctor ring installation tool having positionally adjustable alignment mechanisms.

In addition to the above described features and configurations, in further alternative embodiments, additional and/or alternative structures which permit radial adjustability of first and second alignment mechanisms 5 and 7 are contemplated. In this regard, it is recognized that different automotive manufacturers will typically manufacture reluctor rings and/or crankshafts with different dimensions and/or configurations and, therefore, a reluctor ring installation tool which accounts for such differences is desired. In view of these differences inherent among different brands of reluctor rings and crankshafts, in at least one embodiment of tool 1, one or both of first and second alignment mechanisms 5 and 7 are adjustable radially about the circumference of tool body 3, thereby to accommodate potential alternate locations of reluctor ring and crankshaft alignment reference apertures 102 and 104 (e.g. in certain embodiments such as illustrated in FIG. 5, cross member 9 can be manually rotated to effect such radial adjustability with flange 11 being rotatable in a similar fashion). In still further embodiments, alignment mechanisms 5 and 7 are adjustable in further spatial dimensions, including horizontally, vertically, and various combinations thereof. Moreover, in yet additional alternative embodiments in which tool body 3 is not tubular or cylindrical, other mechanisms for providing spatial adjustability are, of course, contemplated.

EXAMPLE

Notwithstanding the above features, the embodiment of tool 1 illustrated in FIGS. 1 and 2 is specifically configured for use with certain General Motors™ engine parts, including those installed on General Motors™ Generation III Engines including the 4.8 L, LR4, 5.3/LM7, 5.7 LS1, and 6.0 LQ4. In this regard, FIGS. 1 and 2 illustrate a tool 1 in which the spatial orientations and dimensions of first and second alignment mechanism 5 and 7 are optimized for installation and phase calibration of such General Motors™ engine parts. In this regard, it is noted that crankshaft 101 and reluctor ring 103 each include a uniquely sized and located aperture for which alignment mechanisms 5 and 7 have been specifically located and configured.

As such, in order to install reluctor ring 103 on crankshaft 101, tool 1 is simply oriented such that alignment mechanism 7 registers with uniquely sized reference aperture 104 (an 8 mm aperture), and so that alignment mechanism 5 registers with aperture 102 (a 11 mm aperture located on the flywheel flange). If it is necessary to adjust the length of alignment mechanisms 5 and 7 so that sufficient engagement with the reference apertures is possible, such adjustments can be made at this time. Once properly aligned, reluctor ring 103 can be press fit (i.e. friction fit) onto the crankshaft end or heated (e.g. to approximately 450° F.) and then installed thereon to cool. If the alignment mechanisms are properly registered with the respective, matching reference apertures, the reluctor ring will be installed in the correct phase orientation, and proper ignition timing will result.

Although the above described exemplar embodiments are particularly efficacious for their described purposes, it is understood, of course, that other embodiments and configurations can be employed utilizing the same principles as delineated above. For example, tool body 3 need not be cylindrical or tubular, and instead may be comprised of a simple framework carrying first and second alignment mechanisms for registration with the reference apertures. Furthermore, alternatives to the dowel-type alignment mechanisms can be employed and/or other alignment reference structures on the crankshaft and/or reluctor ring used.

Once given the above disclosure, many other features, modifications, and improvements will become apparent to the skilled artisan. Such other features, modifications, and improvements are therefore considered to be part of this invention, the scope of which is to be determined by the following claims:

What is claimed is:

1. A tool for installing a reluctor ring on a crankshaft comprising:

a cylindrical, hollow tool body having a first end and a second end, at least said second end having a cylindrical open end configured to match a flywheel flange, said tool body having an interior cylindrical surface defining an interior of said tool body and an exterior cylindrical surface extending parallel with and to said interior cylindrical surface and defining an exterior of said tool body;

a first alignment dowel located within said hollow portion of said tool body and extending downwardly towards said second open end generally parallel to said interior cylindrical surface;

a second alignment dowel connected to a flange extending from said exterior cylindrical surface of said tool body, said second alignment dowel extending downwardly in a direction of said second open end and generally parallel to said first alignment dowel;

wherein said first and second alignment dowels are so located and spaced, one with respect to the other in the same spatial distance as spacing between a crankshaft reference aperture and a reluctor ring reference aperture such that said first and second alignment dowels physically align with said respective crankshaft and reluctor ring reference apertures.

2. The tool according to claim 1 wherein said first alignment dowel is vertically and horizontally spaced from said second alignment dowel.

3. The tool according to claim 2 wherein said first alignment dowel has a diameter which is preselected to be complementary to a diameter of said crankshaft reference aperture so as to be engageable thereto, and said second alignment dowel has a diameter which is preselected to be complementary to a diameter of said reluctor ring reference aperture so as to be engageable thereto.

4. The tool according to claim 3 wherein at least one of said first and second alignment dowels is axially adjustable in position within an alignment dowel aperture in a direction which is generally in-line with a centerline axis of said respective at least first or second alignment dowel.

5. The tool according to claim 4 wherein said first and said second alignment dowels are each axially adjustable in position within first and second alignment dowel apertures, respectively, in directions which are generally in-line with centerline axes of said respective alignment dowels and wherein said first and said second alignment dowel apertures are located vertically and horizontally spaced from one another on said tool body.

6. The tool according to claim 5 wherein said interior and said exterior surfaces of said cylindrical tool body define a shape which is substantially complementary to a cross-section of a crankshaft such that said tool body can be installed on a portion of the crankshaft.

7. The tool according to claim 5 wherein said first and second alignment dowel apertures have a portion thereof which is threaded and wherein said first and second alignment dowels include a threaded surface for engagement with said threaded portions of said first and second alignment dowel apertures thereby to allow continuous axial adjustability of said first and second alignment dowels therewithin.

8. The tool according to claim 3 wherein said tool is so constructed such that the location of at least one of said first and said second alignment dowels is user selectable thereby to allow indexing of said alignment dowels for adjusting said tool for installing reluctor rings on a plurality of manufacturer crankshafts.

9. The tool according to claim 8 wherein at least one of said first and second alignment dowels is adjustably engaged to said tool body thereby to allow an adjustment of the location of said alignment dowel with respect to the other, and further including indexing indicia located in connection with said tool body, said indexing indicia indicating a plurality of alignment dowel location information correlating to a plurality of reluctor ring installation orientations for different crankshaft types or calibration orientations.

10. The tool according to claim 9 wherein at least one of said alignment dowels is adjustable in position in at least two dimensions of space.

11. The tool according to claim 10 further including a moveable cross-member extending at least partially across a portion of said first end of said tool body, said cross-member carrying said second alignment dowel.

* * * * *